United States Patent [19]

Sakai et al.

[11] Patent Number: 4,708,626

[45] Date of Patent: Nov. 24, 1987

[54] MOLD ASSEMBLY

[75] Inventors: Etsuo Sakai, Ichikawa; Asaaki Nishioka, Chofu; Kiyosi Watanabe, Machida; Iwao Mino, Kamakura, all of Japan

[73] Assignee: Denki Kagaku Kogyo Kabushiki Kaisha, Tokyo, Japan

[21] Appl. No.: 837,449

[22] Filed: Mar. 7, 1986

[30] Foreign Application Priority Data

| Mar. 14, 1985 | [JP] | Japan | 60-49245 |
| Mar. 15, 1985 | [JP] | Japan | 60-50317 |
| Sep. 11, 1985 | [JP] | Japan | 60-199578 |
| Sep. 13, 1985 | [JP] | Japan | 60-203108 |
| Nov. 1, 1985 | [JP] | Japan | 60-244080 |

[51] Int. Cl.$^4$ .................................. B29C 51/30
[52] U.S. Cl. .................................. 425/398; 425/408; 425/416
[58] Field of Search .............. 106/85, 97-99; 249/134, 135; 425/398, 405 H, 408, 412, 416, DIG. 125

[56] References Cited

U.S. PATENT DOCUMENTS

| 2,366,435 | 1/1945 | Brown | 249/163 X |
| 2,463,965 | 3/1949 | Grassi et al. | 249/134 X |
| 2,619,702 | 12/1952 | Blackburn et al. | 249/134 X |
| 2,734,243 | 2/1956 | Lips et al. | 249/135 X |
| 2,979,790 | 4/1961 | Lubalin | 249/134 X |
| 3,313,007 | 4/1967 | James et al. | 249/135 X |
| 3,827,667 | 8/1974 | Lemelson | 249/135 X |
| 3,897,532 | 7/1975 | Lyssy | 425/412 X |
| 4,047,962 | 9/1977 | Copeland | 106/99 X |
| 4,131,477 | 12/1978 | Kagan et al. | 106/98 X |
| 4,244,551 | 1/1981 | Terkelsen et al. | 249/134 |
| 4,307,867 | 12/1981 | Shannon | 249/134 |
| 4,350,486 | 9/1982 | Crosek et al. | 249/134 X |
| 4,447,266 | 5/1984 | Nachfolger | 106/98 X |
| 4,504,320 | 3/1985 | Rizer et al. | 106/99 X |
| 4,524,037 | 6/1985 | Marc | 425/398 X |
| 4,531,705 | 7/1985 | Nakagawa et al. | 249/134 |
| 4,559,881 | 12/1985 | Lankard et al. | 106/99 X |
| 4,582,682 | 4/1986 | Betz et al. | 425/405 H X |
| 4,593,627 | 6/1986 | Lankard et al. | 106/99 X |

OTHER PUBLICATIONS

WO81/03170, published Nov. 12, 1981, Batuhie, "Shaped Article and Composite Material and Method for Producing Same".
WO82/01674, published May 27, 1982, Andersen et al., "Tool for Shaping Articles".
WO83/01592, published May 11, 1983, Andersen et al., "A Method of Improving Characteristics of a Moulded Body".

*Primary Examiner*—Robert Spitzer
*Attorney, Agent, or Firm*—Jordan and Hamburg

[57] ABSTRACT

According to the invention, a mold assembly for molding an article is provided. The mold assembly is composed of at least male and female molds. At least one of the male and female molds is made of a hydraulic material composition having high strength containing a hydraulic material as a main ingredient. A molding face of at least one of the male and female molds is made of a substance other than the hydraulic material.

58 Claims, 9 Drawing Figures

MOLD ASSEMBLY

BACKGROUND OF THE INVENTION

1. Field of the Invention;

The present invention relates generally to a mold assembly for molding an article, and more particularly to such a mold assembly which is made of a hardened hydraulic material composition having high strength.

2. Related Art Statement;

Conventional molds or mold assemblies are made of cast irons, steels, zinc base alloys, aluminum or various resins. However, molds made of cast irons, steels, zinc base alloys or aluminum are expensive, since many cumbersome machining steps and long operation times are required for the production thereof. On the other hand, although a mold made of a resin can be fabricated relatively easily, a mold made of a resin cannot withstand a high temperature environment and hence cannot be used for molding a material which requires heating for hardening.

There is, therefore, a demand for a mold assembly which can be fabricated or shaped by a simple operation within a short time period and is excellent in durability.

Since cement concretes are moldable at room temperature and handled readily, they are used for various applications in the arts of civil engineering and building construction. However, any of the conventional cement mortars and concretes could not be used for making a mold or mold assembly, since they have insufficient strength of less than 1000 kgf/cm$^2$ in compressive strength and tend to bleed or exhibit other material separation problems, leading to inferior profiling or shape-reproducing property.

OBJECTS AND SUMMARY OF THE INVENTION

Accordingly, a principal object of this invention is to provide a mold assembly which can be fabricated at room temperature by a simple operation within a short fabrication time and which is high in compressive strength and excellent in durability.

Another object of this invention is to provide a mold assembly made of a material which is free of bleeding or other material separation problems and excellent in profiling property.

A further object of this invention is to provide a mold assembly which can be produced at a low cost and can mold a molded article having a complicated contour and yet with a good finished surface.

Another object of this invention is to provide a mold assembly which can press-mold a metallic material only by fabricating a male mold.

A still further object of this invention is to provide a mold assembly for press-molding a metallic material deeply without leaving scratches or other damage on the processed surface.

Another object of this invention is to provide a mold assembly suited for molding a resin material.

Another object of this invention is to provide a mold assembly suited for molding a resin through the reaction injection molding method.

Yet a further object of this invention is to provide a mold assembly which is easily assembled with a molding machine so as to be capable of molding an article without causing breakdown or damage of the molds and without causing flawed or disfigured molded articles.

Another object of this invention is to provide a mold assembly having a molding face covered by a plated layer firmly attached to the matrix material and deposited by a simple non-electrolysis plating.

The above and other objects of the invention will become apparent from the following description.

A mold assembly for molding an article, according to the invention, comprises a male mold and a female mold, at least one of said male and female molds being made of a hydraulic material composition having high strength containing a hydraulic material as a main ingredient, a molding face of at least one of said male and female molds being made of a substance other than said hydraulic material.

BRIEF DESCRIPTION OF THE DRAWINGS

FIGS. 1 (a) to (d) are flow diagrams showing, in section, a process wherein a male mold of the invention is used in combination with a female mold constituted of a fluid.

DESCRIPTION OF THE INVENTION

The present invention will be described in detail hereinbelow.

The mold assembly of the invention for molding an article includes male and female molds, optionally combined with one or more blank holders, as desired. According to the principal feature of the invention, either one or both of the male and/or female molds are made of a hydraulic material composition having high strength. Either one or both of the molding faces of male and/or female molds are made of a substance other then the hydraulic material composition. Either one of the male or female mold may be, of course, made of a substance other than the hydraulic material composition in its entirety. However, if one of the male or female mold is made of a substance other than the hydraulic material composition in its entirety, at least a portion of the other mold should be made of the hydraulic material composition. On the other hand, if both of the male and female molds are made of the hydraulic material composition, at least one of the molding faces of male and female molds should be made of a substance other than the hydraulic material composition. The blank holder may also be made of the hydraulic material composition. With such a construction, a mold assembly adapted for molding or otherwise shaping a variety of articles can be produced by a simple way within a short fabrication time, with the merit that the mold assembly exhibits excellent fidelity in profiling property.

In consideration of the requirement that the hydraulic material composition containing a hydraulic material as the main ingredient may preferably have a compressive strength of not less than 1000 kgf/cm$^2$ and preferably have a capability of profiling and molding a molded article having complicated shape, a preferred hydraulic material composition used in the practice of the invention contains, other than the hydraulic material, ultra-fine particles, a water reducing agent and optionally other necessary additives. It is desirable that the water content of the composition be as small as possible.

The hydraulic materials which may be used in the present invention include various kinds of cements, mineral materials, combinations of materials having hydraulic activities and activators, and mixtures thereof. Examples of cements are various Portland cements, such as normal Portland cement, high early strength Portland cement, moderate heat Portland cement, white Portland cement and sulfate resisting Portland cement; various oil well cements; blended cements, such as silica cement, fly ash cement and blast furnace cement; and mixtures thereof.

Representative examples of the mineral materials which may be used as the hydraulic material in the composition of the invention are mineral materials of $Ca_3SiO_5$, solid solution of $Ca_3SiO_5$ and mixtures thereof. One example of the solid solution of $Ca_3SiO_5$ is alite which is one of the main constituent minerals of general cements. Although somewhat different stoichiometric formulae have been proposed by individual research workers, the generally accepted formula thereof is $Ca_{105}Mg_2AlO_{36}(AlSi_{35}O_{144})$, as reported by G. Yamaguchi and S. Takagi, Proc. 5th Int'l Symp. Chem. Cement, Tokyo, 1, 181–225 (1968), with optional other trace constituents.

A variety of chemical formulae may be considered depending on the kinds and quantities of components contained in minerals of $Ca_3SiO_5$ and solid solutions of $Ca_3SiO_5$. The minerals of $Ca_3SiO_5$ and/or solid solutions of $Ca_3SiO_5$ used in the invention have the analytical values of X-ray diffractiometry generally agreeing with those of $Ca_3SiO_5$ and alite recorded in the JCPDS cards.

The materials having hydraulic activities include blast furnace slag, fly ash and mixtures thereof. Such a material generally has an average particle size of from 10 to 30 μm, and has no hydraulic property in itself but it is hardened to form a rigid mass when combined with an activator. Activators which may be combined with such materials having hydraulic activities to harden the same have been known in the art, and include a variety of cements; calcium hydroxide; calcium oxide; quick lime; calcium sulfoaluminate minerals; a variety of inorganic and organic alkaline salts, such as carbonates, bicarbonates, hydroxides, silicofluorides and sodium, lithium and potassium salts of gluconic acid and citric acid; and calcium sulfates, i.e. anhydride, hemihydrate and dihydrate of calcium sulfate. Any one of the aforementioned activators may be used singly or two or more of them may be used in combination. Any one or more of these activators may be added in an amount which varies depending on the required properties and the specific kind or combination of the activator used, and it is desirable that not more than 100 parts by weight, preferably not more than 60 parts by weight, of an activator be admixed with 100 parts by weight of the material having hydraulic activity. The particularly preferred material having hydraulic activity is blast furnace slag.

When a substance which releases $Ca(OH)_2$ upon contact with water such as calcium hydroxide, calcium oxide, quick lime, or cements is used as an activator, it improves the fluidity of the entire composition significantly in cooperation with the action of the ultra-fine particles and the water reducing agent, with the result that the ultra-fine particles are dispersed uniformly in-between the particles of the hydraulic material under the action of the water reducing agent to increase the strength of the final solidified mass remarkably. In order to attain the aimed function of improving the fluidity of the composition by the addition of the substance releasing $Ca(OH)_2$ upon contact with water, it suffices to add such a very small quantity that to 100 parts by weight of the total amount of the hydraulic material and the ultra-fine particles there is added not more than 1 part by weight, preferably not more than 0.5 parts by weight, of the $Ca(OH)_2$-releasing substance.

The combination of the aforementioned material having hydraulic activity and the activator is only slightly exothermic to reduce or prevent thermal cracking due to exothermic heat, and in addition has further advantages such that the contraction by hardening or drying of the composition is decreased, and that the composition containing such a material having hydraulic activity is improved in resistance to chemicals.

The composition used in the invention may include, in addition to the hydraulic material, an additive, such as an expansive additive, a rapid hardening agent, a mixing additive for imparting high strength, an accelerator and a retarder. Preferable expansive additives are ettringite type expansive agents, such as "CSA #20" (Trade Name) available from Denki Kagaku Kogyo K.K., and burnt quick limes, particularly burnt quick lime prepared by burning at a temperature of from 1100 to 1300° C. and having an average grain size(diameter) of not more than 10 microns. On the other hand, examples of preferable rapid hardening agents are calcium aluminate system materials, such as alumina cements or combinations of alumina cements with calcium sulfate, the one sold under the Trade Name of "Denka ES" from Denki Kagaku Kogyo K.K., and the one sold under the Trade Name of "Jet Cement" from Onoda Cement Co., Ltd. Examples of effective mixing additives for imparting high strength are calcium sulfate system materials, such as the one sold under the Trade Name of "Denka Σ-1000" from Denki Kagaku Kogyo K.K. and the one sold under the Trade Name "Asano Super Mix" from Nippon Cement Co., Ltd.

Examples of accelerators are chlorides such as calcium chloride, thiocyanates, nitrites, chromates and nitrates. Examples of retarders are saccharides; soluble dextrin; organic acids and salts thereof such as gluconic acid; and inorganic salts such as fluorides.

In ageing the hydraulic material composition used in the invention, it is preferred that the ageing operation includes high temperature ageing effected at about 50° C. to 250° C. or includes high temperature and high pressure ageing effected at about 50° C. to 250° C. in order to obviate continuation of reaction extending over too long ageing period and thereby to improve the stability of the aged mass. It is also possible to compensate the contraction by the use of an expansive cement, to allow attainment of required strength in a relatively short ageing time by the use of a rapid hardening cement, or to increase the strength of the hardened mass by the use of a calcium sulfate system mixing agent for imparting high strength.

The ultra-fine particles used in the invention may preferably have an average particle size which is smaller by at least one order than the average particle size of the hydraulic material which ranges generally within 10 to 30 μm. More specifically, it is desirable that the average particle size of the ultra-fine particles is not more than 3 μm, preferably not more than 1 μm, and more preferably from about 0.1 to 1 μm. By the addition of the ultra-fine particles, attainment of strength is enhanced and the fluidity of the composition is increased. Examples of preferable ultra-fine particles are silica dust or siliceous dust obtained as the by-products in the preparation of silicon, silicon-containing alloy or zirconia, and other materials which may be used in the invention include calcium carbonate, silica gel, opalic silica, fly ash, blast furnace slag, titanium oxide and aluminium oxide. Any of the mineral materials of $Ca_3SiO_5$ and solid solutions of $Ca_3SiO_5$ may be pulverized in an ultra-fine particle form which may also be used as the ultra-fine particles in the composition of the invention. Hydrate contraction of the composition can be effectively suppressed by the use of ultra-fine particles of opalic silica, fly ash and blast furnace slag prepared by pulverizing them by the combined use of a classification separator and a pulverizer.

Two or more different kinds of ultra-fine particles may be used in combination. For example, 100 parts by weight of ultra-fine opalic silica, fly ash or blast furnace slag is mixed with not more than 75 parts by weight of ultra-fine silica fume particle to use as the ultra-fine particle component in the composition used in the invention.

The ultra-fine particle component is used preferably in an amount so that 60 to 95 parts by weight of hydraulic material is mixed with 5 to 40 parts by weight of ultra-fine particles, and more preferably in an amount so that 65 to 90 parts by weight of hydraulic material is mixed with 10 to 35 parts by weight of ultra-fine particles. If the amount of the ultra-fine particle component is less than 5 parts by weight, the strength of the hardened composition may be lowered below the satisfactory level; whereas if the amount of the ultra-fine particle component is more than 40 parts by weight, the fluidity of the kneaded composition may be lowered to a level to pose difficulty in molding operation and the strength of the hardened composition may be lowered to unsatisfactory level.

The water reducing agent used in the invention is a surface active agent which has a high dispersibility and which may be added to a hydraulic material in a large quantity without accompanying excessively early or retarded setting and without excess air entrainment. Examples of the water reducing agent which may be preferably used in the composition of the invention include those mainly composed of salts of condensation product of naphthalenesulfonic acid and formaldehyde, salts of condensation product of alkylnaphthalene-sulfonic acid and formaldehyde, salts of condensation product of melaminesulfonic acid and formaldehyde, high molecular weight ligninsulfonates and polycarboxylates. In consideration of the effect in improving the fluidity and economy, it is preferred to use salts of condensation product of naphthalene-sulfonic acid and formaldehyde or salts of condensation product of alkylnaphthalenesulfonic acid and formaldehyde. Preferably not more than 10 parts by weight, more preferably 1 to 5 parts by weight, of water reducing agent is added to 100 parts by weight of hydraulic material. The water reducing agent is added with the aim to preparing a composition having a low water/(hydraulic material +ultra-fine particles) ratio, and the addition thereof in excess of 10 parts by weight may adversely affect the hardening of the composition. In the present invention, a water reducing agent is combined with ultra-fine particles so as to obtain a hydraulic material composition which has a fluidity high enough for molding by ordinary molding operation even when the water/(hydraulic material +ultra-fine particles) is not more than 25%.

Although some amount of water is necessary for molding the composition, the water content should be as small as possible for obtaining a hardened mass having high strength, and it is preferred that to 100 parts by weight of the mixture of hydraulic material with ultra-fine particles are added 10 to 30 parts by weight, more preferably 12 to 25 parts by weight, of water. It may become hard to obtain a hardened mass having high strength if more than 30 parts by weight of water is added, whereas difficulties are encountered in molding the composition through ordinary processes, such as casting, if the added amount of water is less than 10 parts by weight. However, the water content is not always limited to the defined range, for example, a composition with less than 10 parts by weight can be molded by the compression molding process. The composition of the invention may be molded through any process generally used for molding ordinary cement concrete compositions, including the extrusion molding process.

In general, to the composition of the invention is added a variety of aggregates. Any of the aggregates generally used for aggregate in the fields of civil engineering and building construction may be used in the composition of the invention, the usable aggregates being river sand, mountain sand, seashore sand, crushed sand, slag sand, crushed rock, river gravel, slag gravel and light-weight aggregates. It is preferred, due to considerable improvement in strength, to use an aggregate selected to have a Moh's hardness of not less than 6, more preferably not more than 7, or in accordance with another standard, to have a Knoop indentor hardness of not less than 700 $kg/mm^2$, more preferably not less than 800 $kg/mm^2$. Examples of the aggregates satisfying the aforementioned requirements defined by either one of the standards are silica, emery, pyrite, ferrite, topaz, lawsonite, diamond, corundum, phenacite, spinel, beryl, chrysoberyl, tourmoline, granite, andalusite, staurolite, zircon, burnt bauxite, calcinated alum shale, boron carbide, tungsten carbide, ferrosilicon nitride, silicon nitride, fused silica, electrofused magnesia, silicon carbide, cubic boron nitride and crushed ceramics. Metallic materials, such as iron or stainless steel, may also be used when it is desired to subject the hardened mass to further machining operation.

An aggegate may generally be used in an amount such that not more than five time by weight of the aggregate is added per unit weight of the sum of the hydraulic material and the ultra-fine particles when the composition is molded by normal casting process. The added amount of the aggregate would vary out of the aforementioned range when the composition of the invention is molded through the prepacked process wherein an aggregate has been preliminarily placed in situ and then the composition in the form of paste or mortar is cast or poured over the aggregate, or when the composition of the invention is molded by the postpacked process wherein the aggregate and the mortar are placed in the vice versa sequence.

Various fibers or nettings may be admixed as reinforcing materials. Examples of fibers suited for this purpose are various natural and synthetic mineral fibers, such as steel fibers, stainless steel fibers, asbestos fibers and alumina fibers, carbon fibers, glass fibers, and natural and synthetic organic fibers, such as propylene, Vinylon, acrylonitrile, polyamide synthetic fibers and cellulose fibers. It is also possible to use other reinforcing materials which have been conventionally used for such purpose, the examples being steel rods or FRP rods.

Materials affording other functions, for example for affording slidablilty, may be contained in the composition. For instance, a so-called solid lubricant, such as molybdenum disulfide, hexagonal boron nitride or carbon which may be impreganted with oil, may be added to the composition of the invention.

A material for affording special functions, such as thermal conductivity or electircal conductivity, may also be added. The process and sequence of addition in mixing and kneading the aforementioned additives are not critical as far as they can be mixed and kneaded to form a uniform admixture. Alternatively, vacuum debubbling may be effected during the kneading and molding operations.

Ageing of the molded mass may be effected by any methods including ageing at room temperature, ageing with vapor at atmospheric pressure, ageing at high temperature and at high pressure and ageing at high temperature. These methods may be combined.

The mold assembly of the invention for molding an article will now be described with reference to the appended drawings.

Figure 1A:
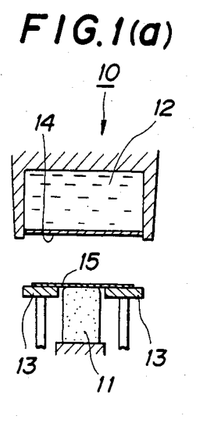
Figure 1B:
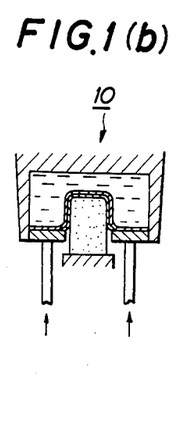
Figure 1C:
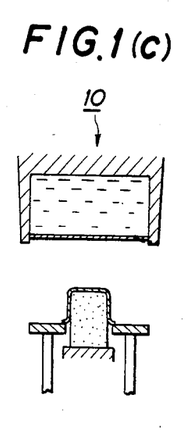
Figure 1D:
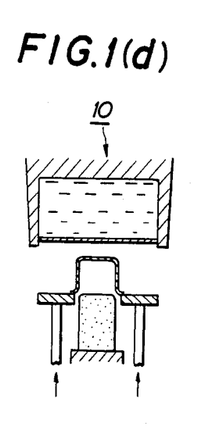
Figure 2:
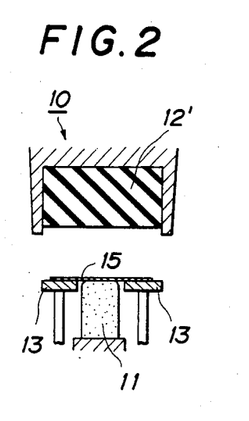
FIG. 2 is a diagrammatical sectional view showing a mold assembly of the invention, wherein a rubber-like elastomer is used as the female mold.

An embodiment of the mold assembly of the invention is generally denoted by reference numeral 10 in FIGS. 1(a) to (d) and FIG. 2. As shown in FIG. 1(a), the mold assembly 10 includes a male mold 11, a female mold 12 and a blank holder 13. The female mold 12 shown in FIG. 1(a) is constituted of a fluid, such as water, oil or air with or without being pressurized, sealingly contained in a defined volume be means of a resilient membrane, such as a rubber membrane 14. The female mold 12' shown in FIG. 2 is constituted of a rubber-like elastic material, such as a urethane rubber in its entirety. In both of the embodiments shown in FIGS. 1(a) and 2, the male molds 11 are made of a cement composition having high strength.

Referring now to FIGS. 1(a) to (d), a process for press-molding a metal plate 15 by means of the mold assembly 10 will be described. The molding process using the mold assembly 10 shown in FIG. 2 is similar to the process shown by FIGS. 1(a) to (d), and will not be described repeatedly. As shown in FIG. 1(b), as the male mold 11 is pushed into the female 12 while holding the marginal portion of the metal plate 15 by the blank holder 13, a fluid pressure is applied on the metal plate 15 so that the metal plate 15 is press-molded. Then, the male mold 11 is pulled off together with the blank holder 13 as shown in FIG. 1(c), and the blank holder is raised as shown in FIG. 1(d) to separate the molded metal plate 15 to complete the process. Since a variety of articles having different contour and dimensions can be formed only by changing the male molds 11 when the embodiments shown in FIGS. 1 and 2 are used, these embodiments are suited to the applications where a variety of different lots of products each having different contour and dimensions with each lot including a small number of products may be produced. Since the female molds 12 and 12' are made of a fluid or a rubber-like elastic material, the upper surface of the metal plate 15 is not scratched or damaged during the pressing step. The surface, i.e. the molding face of the male mold 11 may be covered by a metal layer, a layer of a resin, such as an epoxy resin or an epoxy resin composition containing metal particles, or a layer of a ceramic material, such as alumina, alumina-titania, magnesia or spinel. Such a covering layer may be deposited by a plating, flame spraying, coating or impregnating method.

Figure 3:
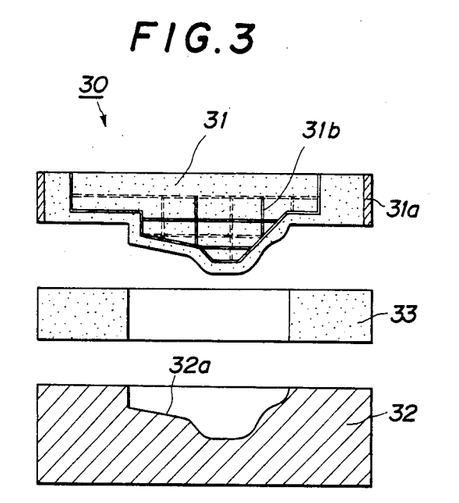
FIG. 3 is a diagrammatical sectional view showing another mold assembly embodying the invention, wherein a metal mold is used as the female mold.

Another embodiment of the mold assembly of the invention is denoted by reference numeral 30 in FIG. 3. The mold assembly 30 comprises a male mold 31, a female mold 32 and a blank holder 33. The male mold 31 is made of a cement composition having high strength, and has a mold frame 31a and reinforcing steel wires 31b. The female mold 32 is made of a metallic material, for example, cast iron, steel or stainless steel, a variety of alloys such as a zinc base alloy or a non-ferrous metal such as aluminum, and may be shaped to have a desired contour and dimensions by casting or tracer controlled milling. The blank holder 33 is made of a cement composition having high strength. Although the female mold 32 is made of a metallic material in its entirety in the illustrated embodiment, a molding face 32a made of a metallic material may be provided as a surface layer. In such a case where only the surface layer is made of a metallic material, the surface layer may be formed by a plating, flame spraying or electro-plating process on a matrix made of a cement composition having high strength or a resin concrete containing an epoxy resin as the main resinous ingredient.

By using a mold made of a cement composition having high strength and a mold made of a metal in combination, a metal plate such as an iron plate, a steel plate, various alloy plates, such as a stainless steel plate, and non-ferrous metal plates, may be easily molded by press molding. It is generally preferred that the male mold 31 and the blank holder 33 are made of a cement composition having high strength, and that the female mold 32 is made of a metallic material, in order to produce a product having good surface conditions. Although it is the most economical measure to make both of the male and female molds from a cement composition having high strength, such a measure is not recommendable since creases due to squeezing are formed when a metal plate is processed through a deep drawing by the use of a mold assembly wherein both of the male and female molds are high in hardness. By the use of a female mold made of a metallic material, the product has a better surface condition as compared with the processed by using a mold assembly wherein both of the male and female molds are high in hardness.

Figure 4:
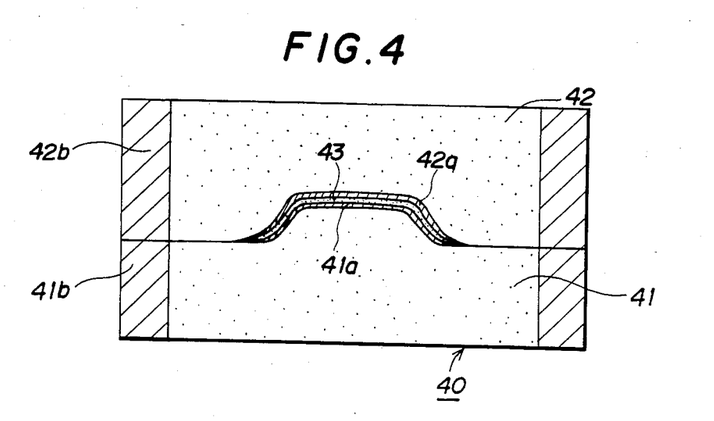
FIG. 4 is a diagrammatical sectional view showing another mold assembly embodying the invention, the mold assembly being particularly suited for the reaction injection molding method.

A further embodiment of the mold assembly of the invention is denoted by reference numeral 40 in FIG. 4. The mold assembly 40 contains a male mold 41 and a female mold 42, and both of the male and female molds 41 and 42 are made of a cement composition having high strength. The male mold 41 and the female mold 42 have, respectively, metal plating layers 41a and 42a. The male mold 41 and the female mold 42 are fixed to metal frames 41b and 42b.

The mold assembly 40 of this embodiment is particularly suited for molding an article by the reaction injection molding (hereinafter referred to as RIM) process comprising the steps of introducing two main reactants of liquid form, each of the reactants having a low molecular weight, a low vicosity and a high reactivity, into a mixing chamber under a high pressure to allow them to upon and mix with each other, and then injecting the mixture in a closed mold cavity to react within a short time to be solidified. The RIM process has been developed for molding a urethane resin by a high speed molding process, and the greatest merit thereof, when compared with the conventional injection molding process for thermoplastic resins, resides in that starting materials having high activities may be used. Application field of the RIM process is now spreading so as to be used for molding, not only urethane resins but also other resins, such as nylon, epoxy resins and polyester resins, and for molding polymer composite materials made of, for example, a urethane resin and an epoxy resin, or an urethane resin and a polyester resin. As a material for a mold assembly used in such RIM process, iron, aluminum, zinc alloys and nickel have been predominantly used in the prior art. In general, the material for a mold assembly used in the RIM process is selected in consideration of the durability, resistance to abrasion and cost, and an important factor for the selection of the material therefor is that it has high thermal conductivity and forms a good skin layer. Since the RIM process is suited for producing small numbers of various articles each having different shape and dimensions, it provides a particular advantage of reduction of operation time if the process for preparing a mold assembly for use in the RIM process can be simplified. Since the mold assembly 40 of the invention is made of a cement composition, the time required for the preparation of the mold assembly is about a week which is remarkably shorter than the time required for the preparation of the conventional mold assembly, namely 12 to 22 weeks.

As shown in FIG. 4, a liquid high molecular weight resinous mixture is injected under high pressure into a sealingly closed cavity of the mold assembly 40 and is molded therein. The molded article 43 may be used as it is or may be coated with a variety of coating compositions ready for use as a part. A releasing agent may be used to prevent the molded article from adhering to the mold faces, when a urethane resin is molded in the mold assembly. For this purpose, various releasing agents may be used, the examples being silicone resin base releasing agents, wax base releasing agents and surfactant base releasing agents.

The surfaces of the molds 40 made of a hardened cement composition may be covered with metal plating layers 41a and 42a which are then subjected to mirror finishing, when an article satisfying a high accuracy requirement is molded.

In order to cover the molding faces of the mold made of a hydraulic material composition with metal plating layers, a non-electrolysis plating method may be adopted. In detail, when the surface of the hardened hydraulic material composition is stained with oily materials, such as a releasing agent, the surface is rinsed with a rinsing agent, such as acetone, for dissolving oily materials and water, and then washed with water, or the oily materials are rinsed with an oleophilic solvent, such as trichloroethylene, followed by drying. Thereafter, the mold matrix made of the hardened hydraulic material composition is dipped in a weakly acidic solution of a salt of platinum group element, such as a salt of palladium, which acts as a catalyst, or such a solution is sprayed over the surface of the mold matrix, to form a skin membrane provided with a catalytic activity over the surface of the mold matrix. Examples of the salts of platinum group elements which may be used for this purpose include salts of Pd, Ru, Rh, Os, Ir and Pt, the representative example being palladium chloride.

The condition for forming such a skin membrane provided wtih catalytic activity is not critical, and the skin membrane may be formed by allowing the surface of the mold matrix to contact a solution containing any of the aforementioned salts at room temperature for 1 to 5 minutes. The concentratin of the water-soluble salt of platinum group element, such as pallidium chloride, is not critical, and generally used is a solution containing 0.001 mol/l to 0.002 mol/l of such a salt. In order to stabilize the water-soluble salt of platinum group element, such as palladium chloride, an acid, such as hydrochloric acid, may be mixed in an amount of about $1 \times 10^{-3}$ mol/l.

Although the mechanism for forming a skin membrane provided with catalytic activity readily on the surface of the mold matrix made of the hydraulic material composition has not been clarified, it is estimated by us that the deposition of catalyst is attributed to the following reaction, When the hydraulic material composition is allowed to contact a solution of a catalyst, by dipping it in the solution or by spraying the solution onto the surface of the hydraulic material composition, the platinum group cations in the solution are reduced by the action of calcium contained in the hydraulic material composition to thereby be deposited on the surface of the hydraulic material composition to form a skin membrane having catalytic activity. A catalyst layer can be readily formed over the surface of the mold matrix without the need of using an agent for reducing the catalyst. Since a catalyst layer is formed by direct reaction taking place between the matrix composition and the solution containing the catalyst constituent, the processing time for impregnating the mold with the solution is advantageously reduced when compared with the conventional process. The mold matrix made of the hydraulic material composition having the thus formed membrane or layer provided with catalytic activity is then allowed to contact a plating solution, by dipping the mold in the plating solution or spraying the plating solution on tthe surface of the mold, to form a plating layer through non-electrolysis plating method. The plating layer may be made of copper, nickel, cobalt, tin, silver, gold or a platinum group metal, or an alloy such as a nickel alloy or a cobalt alloy, or a composite plating composition composed of a metal and a ceramic material. The conditions for plating vary depending on a plating bath used and the thickness of the plating layer to be deposited, and are not critical for the practice of the invention. In general, copper plating may be deposited at room temperature, and nickel plating may be deposited at a temperature of from 70° to 100° C.

As will be understood from the foregoing, a skin membrane of a platinum group element, such as palladium, providing catalytic activity is formed to be ready for the subsequent non-electrolysis plating only by dipping the mold in a solution of salt of palladium group element, such as palladium chloride, without the need of etching by a solution of chromic acid-sulfuric acid and without the need of dipping into an acidic solution of stannous chloride containing stannous chloride and hydrochloric acid used conventionally as a catalyst reducing agent for palladium chloride. In the prior art process for forming a skin layer of a platinum group element, such as palladium, having catalytic activity, stannous chloride is used as a catalyst reducing agent to reduce a salt of platinum group element, such as a salt of palladium, to deposit the platinum group element, such as palladium.

The surface layer formed by the non-electrolysis plating may be applied with a further coating through an electrolysis plating method, or the hydraulic material composition is rendered to be conductive, and then applied with an electrolysis plating layer. The layer formed by electrolysis plating method is made of, for example, nickel, chromium, zinc, gold, silver, tin, various alloys and composite plating materials combined with ceramics. The surface of such a plating layer may be ground by water sanding paper to have mirror finish. A preferable water sanding paper is #200 paper or the like.

A particularly excellent plating layer may be formed on a hydraulic material composition having a dense structure. A dense hydraulic material composition contains, for example, a hydraulic material, ultra-fine particles, a water reducing agent, an aggregate and water; or comprises a hydraulic material as the main ingredient, a hydrophilic high polymer (hereinafter referred simply to as "high polymer") and water. The volume percentage of voids or pores (hereinafter referred to as "porosity") of the dense hydraulic material composition is not more than 30% for the composition containing a hydraulic material, ultra-fine particles, a water reducing agent, an aggregate and water; and the porosity of the dense hydraulic material is not more than 10% for the composition containing a hydraulic material as the main ingredient, a high polymer and water.

Examples of the high polymer used in combination with the hydraulic material include carboxymethyl cellulose, hydroxyethyl cellulose, hydroxyethylmethyl cellulose, hydroxypropylmethyl cellulose, hydroxybutylmethyl cellulose, polyethyleneoxide, copolymers of acrylamide and acrylic acid, polyacrylamide, copolymers of styrene and maleic anhydride, and polyvinyl alcohol. The high polymer is used in an amount of not more than 30 wt%, based on the weight of the hydraulic material, preferably in an amount of 3 to 20 wt%.

Such a hydraulic material composition having a small porosity has high strength and high surface hardness with the surface excellent in smoothness, and thus can be plated with a metal plating layer of good condition, namely a smooth metal plating layer is formed even when the plating layer is thin. Moreover, the adhesive strength between the metal plating layer and the dense hydraulic material composition is high.

Figure 5:
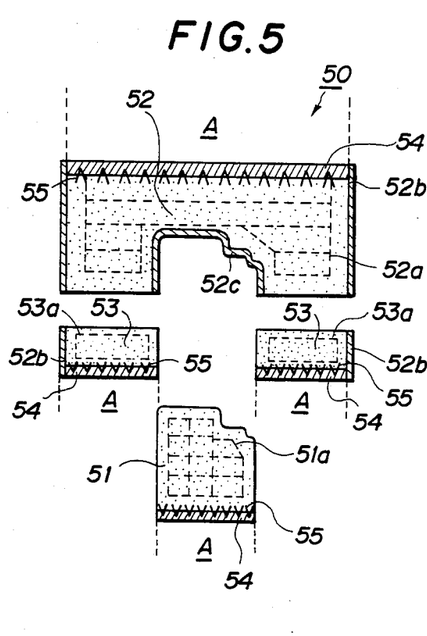
FIGS. 5 and 6 are diagrammatical sectional views showing mold assemblies provided with attachment means for the convenience of combining the same with molding machines.
Figure 6:
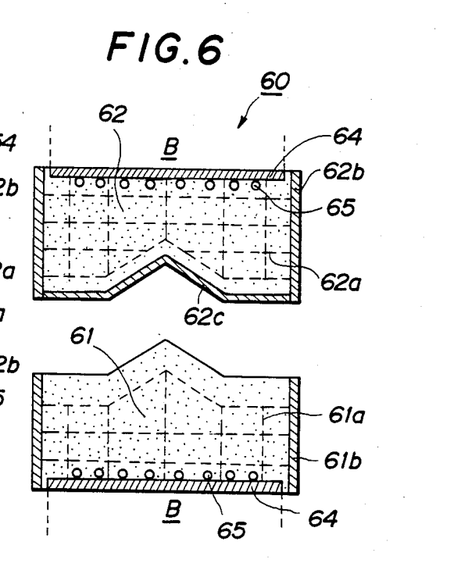

Further embodiments of the mold assembly of the invention are denoted by 50 and 60 in FIGS. 5 and 6. The mold assembly 50 comprises a male mold 51, a female mold 52 and a blank holder 53. All of the members 51, 52 and 53 are made of a cement composition having high strength and reinforced by reinforcing steel wires 51a, 52a and 53a. The female mold 52 and the blank holder 53 are mounted to a respective frame 52b, and a surface layer 52c, is formed on the molding face of the female mold 52. The mold assembly 60 shown in FIG. 6 has a substantially similar construction as the mold assembly 50, the members corresponding to those of the mold assembly 50 being denoted by similar numerals changing those of the FIG. 5 into sixties in FIG. 6. Accordingly, detailed descriptions of the similar members will not be repeated. The mold 60 has no blank holder, and a frame 61b is attached to the male mold 61.

The mold assemblies 50 and 60 are provided with fitting members 54 and 64 for facilitating easy mounting thereof to molding machines A and B, each of the fitting members 54 and 64 being made of a material which can be readily shaped by milling. In the mold assembly 50, the fitting members 54 are fixed to the molds by means of plural bent nails 55. In the mold assembly 60, the fitting members 64 are welded to the molds through deformed steel bars 65. The mold assemblies 50 and 60 can be mounted to the molding machines A ad B at precise positions.

More in detail, when a mold assembly is mounted to a molding machine, the mounting face of the mold should be machined precisely to have accurate dimensions. If the mounting face is of inaccurate dimensions and shape, the pressure from the molding machine is not applied uniformly over the surface of the mold during the molding operation, leading to breakdown of the mold assembly or production of inferior molded articles. In order to machine the surface of a mold assembly made of a hydraulic material composition having high strength to form a mounting face of high accuracy, the operation time required for completing the milling or other shaping operations is three-or four times as long as the time required for machining operation of a mold made of cast iron, steel or a zinc base alloy or made of a resin or calcium sulfate. However, by the provision of the fitting member as aforementioned, the shaping or machining operation for forming the mounting face can be completed within a time that is not longer than the time required for machining a mold made of a material other than the hydraulic material composition. The important property of the material which may be used as the material for the fitting member is the free-cutting property. Although the definition of the free-cutting property has not been established, the lower the hardness of the material becomes, the better free-cutting property has the material. It is preferred that a material used for such purpose has a Rockwell hardness (measured by the JIS Z 2245 Test Method) of not more than 40 by E scale.

A first method for the provision of such a fitting member comprises the step of placing a backing layer made of a binder selected from resins, calcium sulfates, cements and mixtures thereof, or a combination of the binder with a filler having a free-cutting property and selected from air, wood debris, pulp, calcium carbonate particles, metal beads and metal powders on the hydraulic material composition. A second method is to dispose a machinable metal plate such as an iron plate, and a third method is to form a backing layer by flame spraying or plating.

When a cement base material is used as the binder in the first method, the fitting member for engaging with a molding machine is preferably placed at a time point after the main body of the mold has been cast and before water has not yet been evaporated through the face over which the material for the fitting member is placed. The main body and the fitting member are then aged as an integral mass. When a binder other than the cement base material is used, it is preferred that the material for forming the fitting member is cast over the main body of the mold after the main body has been aged through ageing at room temperature and at atmospheric pressure, ageing at high temperature, ageing at high temperature and at a high pressure or a combination thereof. Nails, anchors or the like members may be embedded in the face on which the fitting member for engaging with a molding machine is to be placed at the time when the main body of the mold has not yet been hardened, thereby to improve the binding between the main body and the fitting member.

In a case where a plate is placed on the main body of the mold to form a fitting member for engaging with a molding machine, according to the second method, it is preferred that a plate material is placed on the upper surface of the main body before water has been evaporated from the top face of the main body. In order to increase the binding force between the main body of the mold and the plate material, stud bolts or deformed steel bars may be fixed, for example by welding, onto the surface of the main body on which the plate material is mounted.

When a fitting member is formed by flame spraying or plating method, according to the third method, such a layer is formed after the main body of the mold has been hardened. A layer may be formed by flame spraying method wherein the surface of the hardened main body is roughened by said blasting to have a surface roughness of about 40 microns, and then a molten metal or resin is injected onto the roughened surface. Since the surface of the hardened main body made of a cement base composition does not afford metal bond, a plated layer may be formed through a non-electrolysis plating method or through a non-electrolysis plating step followed by an electrolysis plating step.

It is preferable that the thickness of the fitting member for engaging with a molding machine is thin, generally not more than about 5 cm, since the member is to be cut by machining and acts as a pressure transferring member during the molding step.

The mold assembly of the invention may be used as a mold for molding an article made of an admixture of fibers and a synthetic resin, i.e. a fiber reinforced plastic material (hereinafter referred to as FRP). The known molding methods for molding a FRP using a machine include the sheet molding compound (SMC) and the bulk molding compound (BMC) methods wherein a mixture of fibers and a synthetic resin is molded through press-molding or injection molding and then set or cured by heating, transfer molding method, the injection molding method and similar molding methods. Amongst them, the SMC and BMC methods are advantageous since an article having excellent surface condition or property may be prepared within a short molding cycle, and thus have been utilized for the molding of automobile parts, bathtubs, building materials and electrical parts. These methods are expected to be carried out by automation systems, particularly with the progress of substitution of metal parts by plastics in automobile bodies. The mold assembly of the invention may be effectively used in these molding methods.

Thermo-setting resins, such as unsaturated polyester resins and epoxy resins, are used generally as the synthetic resin in the FRP in combination with various fibers, the typical fibers being fiber glass processed to be hydrophobic. The admixture containing fibers and a synthetic resin as the main ingredients, means a pre-mix of fibers and a synthetic resin before being subjected to a molding process, and includes an uncured mixture and a mixture pre-formed to have a sheet shape.

The mold assembly of the invention may also be used for molding an FRP containing an unsaturated polyester resin or an epoxy resin as the resinous ingredient, such a resin being generally thermo-setting. In such a case, it is necessary to heat the FRP to be cured, and heating is effected by disposing heat adjusting pipes or electrical heating wires within the mold assembly or by means of external heating. Although the mold assembly of the invention has a relatively low thermal conductivity as compared with a mold made of cast iron or similar material because the mold assembly of the invention is made of a hydraulic material, this feature provides a merit rather than disadvantage since the once heated mold assembled is resistant to cooling. The mold assembly of the invention may also be well suited for use in the injection molding process, the blow-molding process and the vacuum molding process.

EXAMPLES OF THE INVENTION

The present invention will now be described more specifically by referring to examples thereof.

EXAMPLE 1

A mold assembly 10 having the construction as shown in FIG. 1 was prepared and used in this Example.

A male mold 11 for molding an article by pressmolding and a blank holder 13 were produced using the composition as set forth in Table 1 through an ordinary method. Steel bars are incorporated to form a composite structure. The composition was aged at 20° C. for one day, and at 50° C. in air saturated with water vapor for 7 days. A test specimen having the dimensions of 4×4×16 cm was prepared under the same preparation conditions, and subjected to test to measure the compressive strength (according to JIS R 5201 Method). The results are shown in Table 1. The female mold 12 was constitued of an oil sealingly enclosed by a rubber membrane 14.

TABLE 1

| | | | | | (parts by weight) | |
|---|---|---|---|---|---|---|
| Cement | Ultra-fine Particle | Water Reducing Agent | Aggregate | Fiber | Water | Compressive Strength |
| 80 | 20 | 2 | 120 | 7 | 19 | 1,840 kgf/cm² |

Materials used:
Cement: White Portland cement produced and sold by Chichibu Cement Co. Ltd.
Ultra-fine Particle: Silica fume (produced and sold by Japan Metals & Chemicals Co., Ltd.) having an average particle size of 0.1 μm.
Aggregate: Dead burnt alum shale having a particle size of 0.3 to 1.2 mm. (A product from China)
Water Reducing Agent: A condensation product of β-naphthalenesulfonic acid and formalin, produced and sold by Dai-ichi Kogyo Seiyaku Co. Ltd. under the Trade Name of "Selflow 110P".
Water: City Water
Fiber: Steel fibers cut by the chatter cutting (produced and sold by the Kobe Cast Iron Works Ltd), and having a fiber length of 2 mm.

A metal plate 15 was placed on the thus prepared male mold 11 and the blank holder 13, as shown in FIG. 1(a), and then the male mold 11 was raised as shown in FIG. 1(b) to carry out a press-molding. The result was that a steel plate having a thickness of 0.8 mm could be molded without any problem.

EXAMPLE 2

A part for a motorcycle was molded using a mold assembly having a construction as denote by 30 in FIG. 3. A male mold 31 for molding an article by press-molding and a blank holder 33 were produced using the composition as set forth in Table 1. The ageing conditions were the same as in Example 1. A female mold 32 was fabricated from cast iron through an ordinary method.

The aforementioned mold assembly 30 was mounted on a "600pp-123 Press" available from Kawasaki Yucoh Company Limited, and a 0.8 mm thick steel plate was pressed at a P-pressure of 300 tons and at a C-pressure of 60 tons. The press molding was completed successfully. Twenty weeks were expanded for the production of a conventional mold assembly having a male mold and a female mold, both being made of a cast iron, whereas the mold assembly of the invention wherein only the female mold 31 was made of cast iron could be produced within about one week with a satisfactory result that a steel plate was press-molded without impairing the appearance of the molded product.

EXAMPLE 3

A mold assembly for use in the RIM method was prepared, the mold assembly having the construction similar to that denoted by 40 in FIG. 4. Metal plating layers 41a and 42a were formed by a non-electrolysis plating emthod to deposit a nickel plating. Both of the main bodies of the male and female molds 41 and 42 were made of the composition as set forth in Table 1.

A polyurethane was used as a resinous material to mold bumpers for an automobile to obtain parts of good quality. Likewise, a polypropylene and an ABS resin were molded through the injection molding method while using the similar mold assemblies to mold a horn and a shift lever cover for an automobile, whereby parts of good quality were produced.

EXAMPLE 4

A mold assembly made of a cement base composition and having a construction the same as the mold assembly denoted by 50 in FIG. 5 was prepared. The mold was prepared for molding an oil tank for an autocycle, and had the dimensions of 1200×600×400 mm. To be ready for mounting the mold assembly on a molding machine, the fitting member 54 was machined until the top face of the fitting member had a dimensional accuracy ranging within 3/100 mm relative to the face of the press. A variety of materials set forth in Table 2 was used to form the fitting member 54 which was cut by about 5 mm. Machining was effected by using a milling machine Model "FNC-106" available from Makino Milling Machine Company, Limited.

TABLE 2

| Fitting Member for Engaging with Molding Machine (Thickness: about 25 mm) | Time for Milling |
| --- | --- |
| None; A bare mold assembly made of a cement base composition was subjected to milling operation. | 9 hrs. |
| A fitting member made of a cement-silica system material was used. (Available from Denki Kagaku Kogyo K.K. under the Trade Name of "Denka SL".) | 6 hrs. |
| A fitting member made of a resin-wood system material was used. (Available from Kokusai Chemical Company, Limited under the Trade Name of "Epoxy Blend Resin Plus Cements WR".) | 2 hrs. |
| A fitting member made of an epoxy resin base material was used. (Available from Ciba-Geigy Limited under the Trade Name of "Araldite-CW 210".) | 2.5 hrs. |
| A fitting member made of a calcium sulfate-resin system material was used. (A press material available from Fuji Gypsum Company, Limited.) | 3 hrs. |

In this Example, a cement base composition having high strength was used for casting each of the main body of the mold assemblies, the cement base composition being composed of 80 parts by weight of white Portland cement (available from Chichibu Cement Co., Ltd.), 20 parts by weight of a silica flour (available from Japan Metal & Chemicals Co., Ltd.), 2 parts by weight of a water reducing agent (available from Dai-ichi Kogyo Seiyaku Co., Ltd. under the Trade Name of "Selflow 110P"), 150 parts by weight of dead burnt alum shale (produced in China) having a particle size of from 0.3 to 1.2 mm and 19 parts by weight of water. The cement base composition was kneaded in a vaccum type Omni-mixer and cast by a vacuum-casting method. The casting products were allowed to stand at 20° C. for one day, and then aged at 50° C. by steam for one day to produce the molds.

Each of the mold assemblies 50 made of the cement base composition and fitted with respective fitting members was mounted on "600pp-123 Press" available from Kawasaki Yucoh Company Limited, and 0.8 mm thick steel plates were successively pressed at a P-pressure of 350 tons and at a C-pressure 80 tons. Each of the mold assemblies had not been deformed or otherwise damaged so as to be incapable of continuing a further molding, even after 50 molding operations.

EXAMPLE 5

A mold assembly made of a cement base composition and having a construction same as the mold assembly denoted by 60 in FIG. 6 was prepared for molding a battery cover casing. The mold assembly had the dimensions of 1000×600×400 mm. An iron plate (Initial Thickness Just after Installation: 25 mm) similar to that denoted by 64 in FIG. 6 was assembled in each of the male and female molds 61 and 62 which were made of the same cement base composition and aged under the same ageing conditions as in Example 4. The iron plate 64 was milled by about 5 mm to attain a dimensional accuracy of 3/100 mm relative to the press face of a molding machine. For the comparison purpose, the face of a comparative mold was milled by about 5 mm. The time required for milling operation for respective samples are shown in Table 3.

TABLE 3

| Fitting Member for Engaging with Molding Machine (Thickness: about 25 mm) | Time for Milling |
| --- | --- |
| None; A bare mold assembly made of a cement base composition was subjected to milling operation. | 7 hrs. |
| A fitting member made of an iron plate was used. | 1.5 hrs. |

Using the mold assembly 60 of the invention, 2 mm thick steel plates were successively pressed at a pressure of 150 tons to reveal that the mold assembly had not been deformed and retained the capability of molding after 100 molding operations.

EXAMPLE 6

Hardened masses obtained from the compositions as set forth in Table 4 were rinsed with acetone to clean the surfaces thereof, dried and then plated with nickel plated layers through various non-electrolysis plating methods as listed in Table 4. The results are shown in Table 4.

The plated layers were firmly adhering to the matrices of all the tested molds immediately after the non-electrolysis plating process. However, after being subjected to thermal treatment, only the plated layer covering the hydraulic material composition adhered firmly on the matrix. The plated layers deposited on the resin base matrices were easily peeled only by the nail scratching test. The nickel plated layer formed in the practice of the invention had an extremely smooth surface and excellent adhesive strength.

TABLE 4

| Run No. | 1 | 2 | 3 | 4 |
|---|---|---|---|---|
| Matrix Composition | Cement Base | Calcium Sulfate Base | ABS Resin | Phenol Resin |
| Pre-treating Solution and Immersing Time | Solution B 5 minutes | Solution B 5 minutes | Solution A, 2 min. + Solution B, 5 min. | Solution A, 2 min. + Solution B, 5 min. |
| Condition of Plating Just after the Non-electrolysis Plating | Acceptable surface condition; Not peeled-off | Acceptable surface condition; Not peeled-off | Acceptable surface condition; Not peeled-off | Acceptable surface condition; Not peeled-off |
| Condition of Plating after Heating at 200° C. for 1 hour | Acceptable surface condition; Not peeled-off | Acceptable surface condition; Not peeled-off | Matrix was deformed, Plating layer was peeled-off. | Plating layer was peeled-off. |

Note 1: Cement Base Composition - Normal Portland Cement 100 parts
(Available from Denki Kagaku Kogyo K.K.)
Water 40 parts
Toyoura Standard Siliceous Sand 200 parts
Calcium Sulfate Base Composition - Hemihydrate of Calcium Sulfate (Reagent grade) 100 parts
Water 20 parts
Note 2: Ageing Condition for Hardened Matrix - Ageing at 20° C. for 7 days in dry air.
Note 3: Condition for Etching - The cement base composition and the calcium sulfate base composition were not etched. The ABS and phenol resins wereimmersed in a 10% (by volume) hydrochloric acid solution for 30 seconds.
Note 4: Solution A - 10 g of stannous chloride and 40 ml of hydrochloric acid were dissolved in water to obtain 1 l of Solution A.
Solution B - 0.25 g of palladium chloride and 2.5 ml of hydrochloric acid were dissolved in water to obtain 1 l of Solution A.
Note 5: Condition for Plating - Using a solution containing 30 g/l of nickel chloride, 10 g/l of sodium hypophosphate and 50 g/l of sodium hydroxyacetate, and plating was effected at 70° C. for 3 hours.

EXAMPLE 7

The compositions set forth in Table 5 were kneaded in a mixer, and a test specimen having the dimensions of $2\phi \times 5$ cm was molded under reduced pressure developed by suction from each of the compositions. After the lapse of one day, each test specimen was aged at 20° C. in pure water for 7 days. After the completion of ageing, the test specimen was dried at 105° C. to obtain a hardened specimen which was weighed in air and the weight (A) thereof was recorded as the constant weight. Thereafter, each test specimen was immersed in boiled water to fill all pores thereof with water, and the weight of the specimen impregnated with water was weighed in water to learn the weight in water (B) and then weighted in air to learn the weight in air (C). The porosity of each specimen was calculated from the following equation:

Porosity (%) = $[\{(C)-(A)\}/(B)] \times 100$

The results are shown in Table 5.

TABLE 5

| Run No. | Cement | Ultra-fine Particle | Water Reducing Agent | Water | Porosity (%) |
|---|---|---|---|---|---|
| 5 | 100 | 0 | 0 | 35 | 36 |
| 6 | 100 | 0 | 0.5 | 31 | 33 |
| 7 | 90 | 10 | 0.5 | 31 | 31.4 |
| 8 | 80 | 20 | 1.0 | 31 | 31.7 |
| 9 | 70 | 30 | 1.0 | 31 | 30.5 |
| 10 | 60 | 40 | 1.5 | 31 | 31.3 |
| 11 | 95 | 5 | 2.0 | 25 | 29.2 |
| 12 | 90 | 10 | 2.0 | 25 | 27.8 |
| 13 | 95 | 5 | 2.0 | 20 | 25.0 |
| 14 | 90 | 10 | 2.0 | 20 | 22.8 |
| 15 | 70 | 30 | 2.0 | 20 | 19.7 |
| 16 | 90 | 10 | 2.0 | 15 | 20.1 |
| 17 | 80 | 20 | 2.0 | 15 | 16.6 |
| 18 | 75 | 25 | 2.0 | 15 | 13.2 |

Material Used
Cement: Normal Portland cement (Denki Kagaku Kogyo KK)
Ultra-fine Particle: Silica fume (Elkem Co., Ltd.)
Water reducing agent: Selflow R 155 (Dai-ichi Kogyo Seiyaku Co., Ltd.)

EXAMPLE 8

To each of the compositions of Run Nos. 5 and 14 was added siliceous sand in a ratio such that the weight of the added siliceous sand was equal to the total weight of the cement and the ultra-fine particles contained in each composition. A hardened matrix was produced from each admixture similar to Example 7, and the hardened matrix was plated by non-electrolysis plating using each of the pre-treating solutions as set forth in Table 6. The results are shown in Table 6. The plated metal was nickel, and the used non-electrolysis plating solution was prepared by diluting a solution commercially sold under the Trade Name of "Kanigen Blue Shumer" in the standard dilution ratio (catalogue ratio). The non-electrolysis plating was conducted at 70° C. for 3 hours. Prior to the plating step, each matrix or test piece was rinsed with trichloroethylene for degreasing, followed by drying the surfaces, and then immersed in respective pre-treating solutions for 5 minutes. Of course, after being removed from each pre-treating solution bath, the matrix or test piece was rinsed with water prior to being immersed in the next pre-treating solution.

TABLE 6

| Run No. | Composition of Matrix | Pre-treating Solution | Condition of Plated Layer |
|---|---|---|---|
| 19 | Run No. 14 + Siliceous Sand | Solution B | Fine |
| 20 | Run No. 14 + Siliceous Sand | Solution C | Fine |
| 21 | Run No. 14 + Siliceous Sand | Solutions (A + B) | Not deposited |
| 22 | Run No. 14 + Siliceous Sand | Solutions (D + E) | Not deposited |
| 23 | Run No. 5 + Siliceous Sand | Solution B | Inferior |
| 24 | Run No. 5 + Siliceous Sand | Solution C | Inferior |

TABLE 6-continued

| Run No. | Composition of Matrix | Pre-treating Solution | Condition of Plated Layer |
|---|---|---|---|
| 25 | Run No. 5 + Siliceous Sand | Solutions (A + B) | Not deposited |
| 26 | Run No. 5 + Siliceous Sand | Solutions (D + E) | Not deposited |

The solutions used for pre-treatment are as follows.

Solution A: 10 g of stannous chloride and 40 ml of hydrochloric
acid are diluted with water to have a volume of 1 l.

Solution B: 0.25 g of palladium chloride and 2.5 ml of hydrochloric
acid are diluted with water to have a volume of 1 l.

Solution C: The standard solution of a commercially available palladium chloride base pre-treating solution produced by Japan Kanigen Co., Ltd. and sold under the Trade Name of "Red Shumer".

Solution D: The standard solution of a commercially available colloidal pre-treating solution containing stannous chloride and palladium chloride, produced and sold by Hitachi Chemical Co., Ltd. under the Trade Name of "HS-10113".

Solution E: The standard solution of a commercially available rinsing solution produced and sold by Hitachi Chemical Co., Ltd. under the Trade Name of "ADP-20113".

The test results showed that the hardened and plated matrices were in satisfactory condition and plated with nickel layer which was not peeled by the nail-rubbing test.

EXAMPLE 9

100 parts by weight of an alumina cement produced and sold by Denki Kagaku Kogyo K.K. under the Trade Name of "Denka Alumina Cement No. 1" was mixed with 8 parts by weight of a powder of polyvinyl alcohol produced and sold by Denki Kagaku Kogyo under the Trade Name of "Denka Poval B-245", and added with 11 parts by weight of water, followed by mixing by twin rollers for 5 minutes.

A 2 mm thick sheet made of the aforementioned mixture was discharged from the rollers, and pressed at 120° C. and at 50 kg/cm$^2$ for 10 minutes, followed by ageing at 50° C. for 7 days, to obtain a matrix on which a plated layer was deposited by non-electrolysis plating. The thus obtained matrix had a porosity of 0.8%. Test pieces of the matrix were deposited with plated layers similarly as in Example 8 except that the pre-treating solutions set forth in Table 7 were used. The results are shown in Table 7.

TABLE 7

| Run No. | Pre-treating Solution | Condition of Plated Layer |
|---|---|---|
| 27 | Solution B | fine |
| 28 | Solution C | fine |
| 29 | Solutions (A + B) | Not deposited |
| 30 | Solutions (D + E) | Not deposited |

The test results showed that the hardened and plated matrices were sufficiently dense and plated with nickel layers which were not peeled by the nail-rubbing test.

EXAMPLE 10

The composition of Run No. 14 in Example 7 was mixed with a siliceous sand to prepare a hardened matrix. Test pieces made of the hardened matrix were treated with pre-treating solutions set forth in Table 8 and then immersed in a non-elecrolysis plating bath to be plated with copper. The non-electrolysis plating solution used for plating copper consisted of 29 g/l of copper sulfate, 25 g/l of sodium carbonate, 140 g/l of soduim potassium tartarate, 40 g/l of sodium hydroxide and 150 m l of 37% formalin. The non-electrolysis plating was effected at 20° C. for an hour. The results are shown in Table 8.

TABLE 8

| Run No. | Pre-treating Solution | Condition of Plated Layer |
|---|---|---|
| 31 | Solution B | Fine |
| 32 | Solution C | Fine |
| 33 | Solutions (A + B) | Not deposited |
| 34 | Solutions (D + E) | Not deposited |

Test results showed satisfactory results. It was also ascertained that the copper plated layers deposited on the surfaces of the hardened matrix pieces had adhesive strength high enough for resistance to mail-scratching test.

EXAMPLE 11

A mold assembly made of a cement base composition having high strength was fabricated using the following composition. The fabrication time required for the mold assembly of this Example was only one week which was remarkably reduced when compared in terms of the time, generally ranging about 12 to 22 weeks, required for the fabrication of the conventional mold assembly. Nickel was plated over the molding face of the female mold through a non-electrolysis plating method.

The compressive strength of the hardened cement base composition was 1,750 kgf/cm$^2$.

| Composition (part by weight): | |
|---|---|
| Cement: Normal Portland Cement (available from Sumitomo Cement Co. Ltd.) | 80 |
| Ultra-fine Particle: Silica Fume (available from Japan Metals & Chemicals Co., Ltd.) | 20 |
| Aggregate: Dead Burnt Alum Shale (Particle Size: 0.3 to 1.2 mm) | 120 |
| Water Reducing Agent: "Selflow 110 P" (A condensation product of β-naphthalenesulfonic acid and formalin, available from Dai-ichi Kogyo Seiyaku Co., Ltd.) | 2 |
| Fiber: Steel Fiber Cut by Chatter Cutting (Fiber Length: l = 2 mm, available from Kobe Cast Iron Works Ltd.) | 7 |
| Water: City Water | 20 |

The aforementioned mold assembly made of the hardened cement base composition having high strength was used for the practice of the SMC process. The material for SMC comprised a fiber glass, an unsaturated polyester resin, a hardener, a viscosity increasing agent, a filler and a pigment. The mold assembly was heated by hot air to 150° C., and the material for SMC was pressed under a pressure of 120 kg/cm$^2$. An FRP molded article having good surface luster was produced.

EXAMPLE 12

A mold assembly made of a cement base composition having high strength was fabricated using the following composition. THe compressive strength of the hardened cement base composition was 1,540 kgf/cm$^2$.

Nickel was plated over the molding face of the female mold through a non-electrolysis plating method.

| Composition (part by weight): | |
| --- | --- |
| Cement: Normal Portland Cement | 80 |
| (Available from Sumitomo Cement Co. Ltd.) | |
| Ultra-fine Particle: Silica Fume | 20 |
| (Available from Japan Metals & Chemicals Co., Ltd.) | |
| Aggregate: Iron Powder | 200 |
| (Available from OZEKI.) | |
| Water Reducing Agent: "Selflow 110 P" | 2 |
| (A condensation product of β-naphthalenesulfonic acid and formalin, available from Dai-ichi Kogyo Seiyaku Co., Ltd.) | |
| Fiber: Steel Fiber Cut by Chatter Cutting | 7 |
| (Fiber Length: l = 2 mm, available from Aishin Seiki Co., Ltd.) | |
| Water: City Water | 23 |

The aforementioned mold assembly made of the hardened cement base composition having high strength was used for molding a BMC by injection molding. The material for BMC comprised a glass fiber, an epoxy resin and a filler. The molding temperature was 150° C. and the injection pressure was 250 kg/cm$^2$. An FRP molded article could be molded under the aforementioned operational conditions.

Although the present invention has been described with reference to the specific examples, it should be understood that various modifications and variations can be easily made by those skilled in the art wihtout departing from the spirit of the invention. Accordingly, the foregoing disclosure should be interpreted as illustrative only and not to be interpreted in a limiting sense. The present invention is limited only by the scope of the following claims.

What is claimed:

1. A mold assembly for molding an article, comprising a male mold and a female mold, said male mold being made of a hydraulic material composition having high strength containing a hydraulic material as a main ingredient, said female mold being made of a substance other than said hydraulic material selected from the group consisting of fluids and rubber-like elastic materials, said male mold being thrust into said female mold so as to deform the female mold.

2. The mold assembly according to claim 1, wherein said hydraulic material composition comprises a hydraulic material, an ultra-fine component, a water reducing agent and water.

3. The mold assembly according to claim 2, wherein said hydraulic material is selected from the group consisting of cements, mineral materials, combinations of materials having hydraulic activities and activators and mixtures thereof.

4. The mold assembly according to claim 3, wherein said cement is selected from the group consisting of Portland cements, oil well cements, blended cements and mixtures thereof.

5. The mold assembly according to claim 3, wherein said mineral material is selected from the group consisting of mineral materials of Ca$_3$SiO$_5$, solid solutions of Ca$_3$SiO$_5$ and mixtures thereof.

6. The mold assembly according to claim 3, wherein said material having hydraulic activity is selected from the group consisting of blast furnace slag, fly ash and mixtures thereof, and said activator is selected from the group consisting of cements, calcium hydroxide, calcium oxide, quick lime, calcium sulfoaluminate minerals, inorganic and organic alkaline salts, calcium sulfate and mixtures thereof.

7. The mold assembly according to claim 3, wherein said activator is selected from the group consisting of calcium hydroxide, calcium oxide, quick lime, cements, and mixtures thereof.

8. The mold assembly according to claim 2, wherein said hydraulic material further contains an additive selected from the group consisting of expansive additives, rapid hardening agents, mixing additives for exhibiting high strength, accelerators, retarders, and mixtures thereof.

9. The mold assembly according to claim 2, wherein said ultra-fine particle component is selected from the group consisting of silica dust, siliceous dust, calcium carbonate, silica gel, opalic silica, fly ash, blast furnace slag, titanium oxide, aluminum oxide, mineral materials of Ca$_3$SiO$_5$, solid solutions of Ca$_3$SiO$_5$ and mixtures thereof.

10. The mold assembly according to claim 2, wherein said ultra-fine particle component has an average particle size of not more than 3 μm.

11. The mold assembly according to claim 2, wherein said water reducing agent is selected from the group consisting of those containing, as the main ingredients, salts of condensation product of naphthalenesulfonic acid and formaldehyde, salts of condensation product of alkylnaphthalenesulfonic acid and formaldehyde, salts of condensation product of melaminesulfonic acid and formaldehyde, high molecular weight ligninsulfonate, polycarboxylates, and mixtures thereof.

12. The mold assembly according to claim 2, wherein said hydraulic material composition further includes an aggegate.

13. The mold assembly according to claim 12, wherein said aggregate has a Moh's hardness of not less than 6.

14. The mold assembly according to claim 12, wherein said aggregate has a Knoop indentor hardness of not less than 700 kg/mm$^2$.

15. The mold assembly according to claim 12, wherein said aggregate is a metallic material.

16. The mold according to claim 1, wherein said fluid is one or more selected from the group consisting of water, oils and air.

17. The mold assembly according to claim 1, wherein said rubber-like elastic material is an urethane rubber.

18. The mold assembly according to claim 1, wherein a fitting member made of a material adapted to be easily machined is provided with said mold assembly at a position for engaging with a molding machine.

19. A mold assembly for molding an article, comprising a male mold and a female mold, one of said male and female molds being made of a hydraulic material composition have high strength containing a hydraulic material as a main ingredient, the other of said male and female molds being made of a substance other than said hydraulic material selected from the group consisting of metallic materials, resins and ceramics.

20. The mold assembly according to claim 19, wherein said hydraulic material composition comprises a hydraulic material, an ultra-fine particle component, a water reducing agent and water.

21. The mold assembly according to claim 20, wherein said hydraulic material is selected from the group consisting of cements, mineral materials, combinations of materials having hydraulic activities and activators and mixtures thereof.

22. The mold assembly according to claim 21, wherein said cement is selected from the group consisting of Portland cements, oil well cements, blended cements and mixtures thereof.

23. The mold assembly according to claim 21, wherein said mineral material is selected from the group consisting of mineral materials of $Ca_3SiO_5$, solid solutions of $Ca_3SiO_5$ and mixtures thereof.

24. The mold assembly according to claim 21, wherein said material having hydraulic activity is selected from the group consisting of blast furnace slag, fly ash and mixtures thereof, and said activator is selected from the group consisting of cements, calcium hydroxide, calcium oxide, quick lime, calcium sulfoaluminate minerals, inorganic and organic alkaline salts, calcium sulfate and mixtures thereof.

25. The mold assembly according to claim 24, wherein said activator is selected from the group consisting of calcium hydroxide, calcium oxide, quick lime, cements, and mixtures thereof.

26. The mold assembly according to claim 20, wherein said hydraulic material further contains an additive selected from the group consisting of expansive additives, rapid hardening agents, mixing additives for exhibiting high strength, accelerators, retarders, and mixtures thereof.

27. The mold assembly according to claim 20, wherein said ultra-fine particle component is selected from the group consisting of silica dust, siliceous dust, calcium carbonate, silica gel, opalic silica, fly ash, blast furnace slag, titanium oxide, aluminum oxide, mineral materials of $Ca_3SiO_5$, solid solutions of $Ca_3SiO_5$ and mixtures thereof.

28. The mold assembly according to claim 20, wherein said ultra-fine particle component has an average particle size of not more than 3 $\mu$m.

29. The mold assembly according to claim 20, wherein said water reducing agent is selected from the group consisting of those containing, as the main ingredients, salts of condensation product of naphthalenesulfonic acid and formaldehyde, salts of condensation product of alkylnaphthalenesulfonic acid and formaldehyde, salts of condensation product of melaminesulfonic acid and formaldehyde, high molecular weight ligninsulfonate, polycarboxylates, and mixtures thereof.

30. The mold assembly according to claim 20, wherein said hydraulic material composition further includes an aggegate.

31. The mold assembly according to claim 30, wherein said aggregate has a Moh's hardness of not less than 6.

32. The mold assembly according to claim 30, wherein said aggregate has a Knoop indentor hardness of not less than 700 kg/mm$^2$.

33. The mold assembly according to claim 30, wherein said aggregate is a metallic material.

34. The mold assembly according to claim 19, wherein said male mold is made of the hydraulic material composition having high strength, and wherein said female mold is made of a metallic material.

35. The mold assembly according to claim 19, wherein a fitting member made of a material adapted to be easily machined is provided with said mold assembly at a position for engaging with a molding machine.

36. The mold assembly according to claim 19, wherein said article is made of a material selected from the group consisting of metal plates, resins formed by a reaction injection molding process, resins formed by an injection molding process, resins formed by a blow molding process, resins formed by a vacuum molding process, and mixtures of fibers and synthetic resins.

37. A mold assembly for molding an article, comprising a male mold and a female mold, at least one of said male and female molds being made of a hydraulic material composition having high strength containing a hydraulic material as a main ingredient, a molding face of at least one of said male and female molds being made of metal formed by a non-electrolysis plating method.

38. The mold assembly according to claim 37, wherein said hydraulic material composition comprises a hydraulic material, an ultra-fine particle component, a water reducing agent and water.

39. The mold assembly according to claim 38, wherein said hydraulic material is selected from the group consisting of cements, mineral materials, combinations of materials having hydraulic activities and activators and mixtures thereof.

40. The mold assembly according to claim 39, wherein said cement is selected from the group consisting of Portland cements, oil well cements, blended cements and mixtures thereof.

41. The mold assembly according to claim 39, wherein said mineral material is selected from the group consisting of mineral materials of $Ca_3SiO_5$, solid solutions of $Ca_3SiO_5$ and mixtures thereof.

42. The mold assembly according to claim 39, wherein said material having hydraulic activity is selected from the group consisting of blast furnace slag, fly ash and mixtures thereof, and said activator is selected from the group consisting of cements, calcium hydroxide, calcium oxide, quick lime, calcium sulfoaluminate minerals, inorganic and organic alkaline salts, calcium sulfate and mixtures thereof.

43. The mold assembly according to claim 42, wherein said activator is selected from the group consisting of calcium hydroxide, calcium oxide, quick lime, cements, and mixtures thereof.

44. The mold assembly according to claim 38, wherein said hydraulic material further contains an additive selected from the group consisting of expansive additives, rapid hardening agents, mixing additives for exhibiting high strength, accelerators, retarders, and mixtures thereof.

45. The mold assembly according to claim 38, wherein said ultra-fine particle component is selected from the group consisting of silica dust, siliceous dust, calcium carbonate, silica gel, opalic silica, fly ash, blast furnace slag, titanium oxide, aluminum oxide, mineral materials of $Ca_3SiO_5$, solid solutions of $Ca_3SiO_5$ and mixtures thereof.

46. The mold assembly according to claim 38, wherein said ultra-fine particle component has an average particle size of not more than 3 $\mu$m.

47. The mold assembly according to claim 38, wherein said water reducing agent is selected from the group consisting of those containing, as the main ingredients, salts of condensation product of naphthalenesulfonic acid and formaldehyde, salts of condensation product of alkylnaphthalenesulfonic acid and formaldehyde, salts of condensation product of melaminesulfonic acid and formaldehyde, high molecular weight ligninsulfonate, polycarboxylates, and mixtures thereof.

48. The mold assembly according to claim 48, wherein said hydraulic material composition further includes an aggregate.

49. The mold assembly according to claim 38, wherein said aggregate has a Moh's hardness of not less than 6.

50. The mold assembly according to claim 48, wherein said aggregate has a Knoop indentor hardness of not less than 700 kg/mm$^2$.

51. The mold assembly according to claim 48, wherein said aggregate is a metallic material.

52. The mold assembly according to claim 37, wherein said male mold is made of the hydraulic material composition having high strength, and wherein said female mold is made of a metallic material.

53. The mold assembly according to claim 37, wherein said male and female molds are made of the hydraulic material composition having high strength, and wherein said molding faces are made of a metallic material.

54. The mold assembly according to claim 37, wherein a fitting member made of a material adapted to be easily machined is provided with said mold assembly at a position for engaging with a molding machine.

55. The mold assembly according to claim 37, wherein said plated molding face is prepared by allowing said hydraulic material composition containing calcium to contact with a catalyst solution to deposit and catalyst to form a coating under the action of said calcium and then forming a plated membrane by a non-electrolysis plating method.

56. The mold assembly according to claim 55, wherein said catalyst solution is a weakly acidic solution of a compound of platinum group metal.

57. The mold assembly according to claim 55, wherein said plated molding face is provided over a surface of said hydraulic material composition having high strength and having a porosity of not more than 30%.

58. The mold assembly according to claim 37, wherein said article is made of a material selected from the group consisting of metal plates, resins formed by a reaction injection molding process, resins formed by an injection molding process, resins formed by a blow molding process, resins formed by a vacuum molding process, and mixtures of fibers and synthetic resins.

* * * * *